(12) United States Patent
Griem

(10) Patent No.: US 7,736,549 B2
(45) Date of Patent: Jun. 15, 2010

(54) FLAME RETARDANT CHEMICAL COMPOSITION

(76) Inventor: John Griem, 63 65th Pl., Long Beach, CA (US) 90803

( * ) Notice: Subject to any disclaimer, the term of this patent is extended or adjusted under 35 U.S.C. 154(b) by 802 days.

(21) Appl. No.: 11/356,135

(22) Filed: Feb. 16, 2006

(65) Prior Publication Data

US 2007/0187657 A1   Aug. 16, 2007

(51) Int. Cl.
C09K 21/04 (2006.01)
C09K 21/06 (2006.01)
A62C 2/00 (2006.01)
A62C 3/00 (2006.01)

(52) U.S. Cl. .............. 252/608; 252/607; 252/606; 169/44; 169/45

(58) Field of Classification Search .......... 252/607, 252/608

See application file for complete search history.

(56) References Cited

U.S. PATENT DOCUMENTS

| | | | | |
|---|---|---|---|---|
| 3,973,920 A | * | 8/1976 | Tadokoro et al. | 428/62 |
| 4,066,391 A | * | 1/1978 | Weyker et al. | 8/185 |
| 4,216,261 A | | 8/1980 | Dias | |
| 4,256,786 A | | 3/1981 | Dias et al. | |
| 4,292,036 A | * | 9/1981 | Walsh et al. | 8/182 |
| 4,720,460 A | * | 1/1988 | Barach et al. | 435/252.9 |
| 4,842,611 A | * | 6/1989 | Huffman | 8/188 |
| 4,888,136 A | * | 12/1989 | Chellapa et al. | 252/607 |
| 4,908,160 A | * | 3/1990 | Thacker | 252/608 |
| 5,011,731 A | * | 4/1991 | Nakamori et al. | 428/222 |
| 5,091,097 A | * | 2/1992 | Pennartz | 252/7 |
| 5,156,890 A | * | 10/1992 | Rock | 427/240 |
| 5,342,656 A | * | 8/1994 | Valso | 427/394 |
| 5,356,568 A | | 10/1994 | Levine | |
| 5,397,509 A | * | 3/1995 | Kostrzecha | 252/607 |
| 5,631,047 A | * | 5/1997 | Friloux | 427/427.6 |
| 5,958,117 A | * | 9/1999 | Crouch et al. | 106/18.11 |
| 6,019,176 A | * | 2/2000 | Crouch | 169/46 |
| 6,322,726 B1 | * | 11/2001 | Vandersall et al. | 252/601 |
| 2003/0193045 A1 | * | 10/2003 | Takeuchi et al. | 252/601 |
| 2004/0022821 A1 | | 2/2004 | Holzner et al. | |
| 2005/0025890 A1 | * | 2/2005 | Cheng | 427/372.2 |
| 2005/0054553 A1 | * | 3/2005 | Frankenbach et al. | 510/515 |
| 2005/0106967 A1 | * | 5/2005 | Suzuki | 442/86 |
| 2005/0116193 A1 | | 6/2005 | Kang et al. | |
| 2005/0222309 A1 | * | 10/2005 | Bauer et al. | 524/115 |

FOREIGN PATENT DOCUMENTS

| | | |
|---|---|---|
| EP | 0 136 120 A | 4/1985 |
| EP | 0 873 768 A | 10/1998 |
| EP | 1 184 422 A | 3/2002 |

* cited by examiner

Primary Examiner—Joseph D Anthony
(74) Attorney, Agent, or Firm—Knobbe Martens Olson & Bear LLP

(57) ABSTRACT

A chemical composition can be applied to materials to impart flame retardancy. The composition includes a mixture of ingredients that is not harmful to humans or the environment. The ingredients of the composition can include a phosphorous containing material, an acidic material, a material that serves as a preservative, and an aqueous solvent.

3 Claims, No Drawings

FLAME RETARDANT CHEMICAL COMPOSITION

BACKGROUND OF THE INVENTION

1. Field of the Invention

This invention relates to chemical compositions having fire retardant properties and more particularly to compositions that can be applied to fabrics or other materials.

2. Description of the Related Art

Fire safety regulations for consumer and other types of goods have caused many manufacturers to make their goods with flame retardant properties. In efforts to comply with these regulations, many manufacturers apply fire retardant chemical compositions to their goods. Unfortunately, many fire retardant chemical compositions are known to contain ingredients that may be toxic to humans and the environment.

Harmful fire resistant compositions include those that are halogenated, particularly those with the halogens chlorine and bromine. Bromine flame retardants (BFRs) and Chlorinated flame retardants (CFRs) have been used for over 30 years, and recent studies indicate that levels of these substances are rapidly building up inside the bodies of humans. Because more testing has been performed on BFRs, more is known as to the harmful effects of BFRs. Studies suggest that BFRs can be linked to immune suppression, cancer, endocrine disruption, and neurobehavioral and developmental effects. BFRs are used widely in consumer products, especially plastics for electronics, foams, and textiles. It is also suspected that CFRs, which are used in textiles, paints and coatings, plastics, and insulation foams, cause harm to humans and the environment.

Effective non-halogenated flame retardants are needed to reduce and or eliminate the use of BFRs and CFRs. Particularly, there is a need for flame retardants that are not harmful to humans or the environment.

SUMMARY OF THE INVENTION

In some embodiments, a composition for imparting flame retardancy is provided that comprises ammonium phosphate, a source of citrate ion, and a source of benzoate ion. In some embodiments, the composition further comprises an aqueous solvent. Preferably, the source of citrate ion is citric acid and/or the source of benzoate ion is sodium benzoate.

In some embodiments, the composition is made up of 1 part of the source of citrate ion to 12.7 to 20 parts of ammonium phosphate to 0.8 to 2.2 parts of the source of benzoate ion. In some embodiments the composition is a liquid, but it is contemplated that the invention can take a granular or solid form.

In some embodiments, the composition has a pH value range of about 4 to about 6. Preferably, the source of citrate ion is added to the composition in an amount that achieves a pH value within this pH range. In some embodiments, a basic material is added to the composition in an amount that achieves a pH value within this pH value range.

In some embodiments, a method is provided that imparts flame retardancy to a material that comprises applying the composition to a material, and the composition comprises ammonium phosphate, a source of citrate ion, and a source of benzoate ion. Preferably, the composition applied with this method comprises 1 part of the source of citrate ion to 12.7 to 20 parts of ammonium phosphate to 0.8 to 2.2 parts of the source of benzoate ion. In some embodiments, the composition is sprayed onto a material. In other embodiments, the material is placed into the composition.

In some embodiments, a method of manufacturing a flame retardant composition is provided in which a composition comprising ammonium phosphate, a source of citrate ion, and a source of benzoate ion is dissolved in an aqueous solvent. Preferably, the ammonium phosphate is dissolved in the aqueous solvent to form a solution, and then citric acid and sodium benzoate are stirred into the solution.

In some embodiments, a composition is provided that consists essentially of ammonium phosphate, citric acid, and sodium benzoate. In some embodiments, the composition further comprises an aqueous solvent.

DETAILED DESCRIPTION OF THE PREFERRED EMBODIMENT

In the following description, for purposes of explanation, numerous specific details are set forth to provide a thorough understanding of the present invention. As will be evident to one skilled in the art, however, the exemplary embodiments may be practiced without these specific details. Although the following embodiments are described with reference to specific examples, the skilled artisan will recognize that no single element of the described embodiments is necessary for the successful practice of the invention, and that the invention can be practiced in various other combinations beyond those described.

Some embodiments of the invention provide a chemical composition that can be used as a flame retardant. In a preferred embodiment, the chemical composition is applied to a surface of a material to provide fire resistant properties to the object. There is no limitation as to the material to which the composition is applied. In some embodiments, the composition can be applied to leather, furniture, plastics, insulation, wood, clothing (especially children's nightwear), or any other material. The flammability of fabrics makes them an especially suitable material. It is also contemplated that the composition could be used in other applications to prevent and/or suppress fire. For example, it is believed that the composition can also be used to suppress fires, such as car fires, house fires and forest fires.

Some embodiments of the invention provide a composition comprising a mixture of ingredients that is not harmful to humans and that preferably contains no halogens. Preferably, the invention is comprised of components that occur naturally in foods or in the body. In some embodiments, the only health effects found in the individual ingredients is an eye irritating effect if the product accidentally comes into contact with the eyes. Preferably, the eye irritating effect is less than that of salt (sodium chloride), natural lemons and/or fruit juice. In some embodiments, the invention provides a composition comprising a mixture of ingredients that is not harmful to the environment. Preferably, the invention provides a composition that is not greasy and that does not emit a distasteful odor when applied to materials.

In some embodiments, the ingredients of the composition include a phosphorous containing material, an acidic material, and a material that serves as a preservative. In some embodiments, the composition further comprises an aqueous solvent and the other composition ingredients are dissolved in the aqueous solvent. The aqueous solvent can be any type of solvent that comprises water. For example, the aqueous solution may be tap water or distilled water. For those embodiments that include an aqueous solvent, the solvent preferably makes up between about 55% and about 95% of the composition. More preferably the aqueous solvent makes up about 72% to 88% water, and most preferably it makes up about 78% to about 82% of the composition.

In some embodiments of the invention, the phosphorous containing material is a phosphate compound, such as ammonium phosphate (CAS no. 10124-31-9), although other types of phosphates, such as potassium or sodium phosphate can be used. Thus, it is contemplated that any type of phosphate compound can be used. A preferred embodiment of the invention includes ammonium phosphate dibasic (CAS no. 7783-28-0). However, it is contemplated that other forms of ammonium phosphate can be used, such as monobasic ammonium phosphate (CAS no. 7722-76-1), ammonium polyphosphate, or some other type of ammonium phosphate compound. The chemical structure of ammonium phosphate dibasic makes it an especially suitable ingredient for some embodiments of the invention. Although a wide range of concentration of ammonium phosphate can be included, ammonium phosphate dibasic preferably makes up about 2% to about 30% of the composition when an aqueous solvent is also present in the composition. More preferably, dibasic ammonium phosphate makes up about 9% to about 23% of the composition, and most preferably, it makes up about 14% to 18% of the composition. It is contemplated that these ranges may shift depending on the type of phosphate containing material that is used.

In some embodiments of the invention, one ingredient of the invention is an acidic material. Preferably, the acidic material is included to regulate the pH level of the invention such that the fire retardant properties of the ammonium phosphate are enhanced. Although the pH can vary throughout a wide range, the pH of the composition is preferably maintained within the pH range of about 5 to 9, more preferably about 6.5 to 7.5. In some embodiments, the pH is about 7. The acidic material can be of any suitable type. For example, acetic acid (CAS. no. 64-19-7) can be used to regulate pH level, or smaller amounts of stronger acids (i.e., hydrochloric acid (CAS no. 7647-01-0)) can be also be effective. In some embodiments, the acidic material is a carboxylate. Preferably, a carboxylate is used that provides a source of citrate ion. The pH can also be adjusted through the use of appropriate phosphate salts, or by addition of small amounts of strong acids, such as HCL, or strong bases, such as NaOH.

Citric acid may be an especially suitable material, as it is a relatively gentle acid that may appeal to the buying public, government regulators, or any others that have reason to review the ingredients of the invention. The amount of acidic material will depend on the type of the acidic material used and can vary throughout a wide range. Preferably, citric acid makes up about 0.25% to about 4% of the composition when an aqueous solvent is also present in the composition. More preferably, the citric acid makes up about 0.75% to about 2% of the composition, and most preferably, it makes up about 0.9% to 1.1% of the composition. It is contemplated that these ranges may shift depending on the type of acidic material used.

In some embodiments of the invention, a preservative material is added to prevent growth of bacteria or mold during transport and/or storage of the composition. Any suitable preservative can be used to serve this purpose. Preferably, the preservative material provides a source of benzoate ion. In some embodiments, the source of benzoate ion is a benzoic acid, and sodium benzoate is the preferred choice. Natriumbenzoate may be especially suitable, as it is a naturally occurring preservative that may appeal to the buying public, government regulators, or any others that have reason to review the ingredients of the invention. In an alternative embodiment, Bronopol (CAS no. 52-51-7) can be used as the preservative material.

Preferably, the preservative material is added in sufficient amount to inhibit the growth of bacteria and mold in the composition for a desired period of time. In embodiments in which sodium benzoate is used, the amount can vary throughout a wide range, but preferably the sodium benzoate makes up about 0.25% to about 7% of the composition when an aqueous solvent is also present in the composition. More preferably, sodium benzoate makes up about 0.75% to about 4% of the composition, and most preferably, it makes up about 0.9% to 2% of the composition. It is contemplated that these ranges may shift depending on the type of preservative material that is used. Advantageously, sodium benzoate in a range between about 0.9% and 2% eliminate all bacteria and mold for at least one year for a composition that is kept at room temperature and in a closed container.

In some embodiments, the composition takes the form of a liquid or a solid. In a preferred embodiment, composition of liquid form includes an aqueous solvent. The composition may also have a solid or granular form. Preferably, the composition is in a liquid form when it is being used. However, an aqueous solvent can be added to the composition at any stage, including after the composition is purchased by a consumer. In some embodiments, the ratio of the ammonium phosphate dibasic, citric acid, and sodium benzoate to each other is not affected by the composition's form. Preferably, the ratio between these ingredients is about 1 part citric acid to about 12.7 to 20 parts of ammonium phosphate dibasic to about 0.8 to 2.2 parts of sodium benzoate. Tests have shown that the composition is especially effective when the ingredients are combined within these ranges of ratios. However, the composition can effectively retard fire when other ratios of these ingredients are used.

The ingredients can be combined in any suitable way to make the composition. An example of one manner by which the ingredients can be combined for a composition that includes an aqueous solvent will now be discussed. Approximately 50% of the aqueous solvent can be poured in to a pan or other container of appropriate size. The ammonium phosphate dibasic can be added while stirring rapidly, and stirring can continue for about 10-15 minutes until the ammonium phosphate dibasic is completely dissolved. Citric acid can then be added while continuing to stir rapidly for about 5 minutes. Sodium benzoate can then be added while continuing to stir rapidly for about another 5 minutes until the liquid is clear. The remaining 50% of aqueous solvent can then be added while continuing to stir the solution for approximately 5 additional minutes. Ideally, the composition will be clear, and the ingredients will be completely dissolved without any visible traces of solid material. This is only one example as to how the ingredients can be combined, and it will be apparent to one skilled in the art that there exist numerous other mixing methods that can be used.

An example of one manner by which the ingredients can be combined for a composition that, at least initially, does not include an aqueous solvent will now be discussed. Ammonium phosphate dibasic can be poured into any type of conventional powder mixer and mixed until all lumps are dissolved. Citric acid can then be added and mixed in the powder mixer until all lumps are dissolved and the ingredients are thoroughly mixed together. The sodium benzoate dibasic can be added next and mixed in the powder mixer until all lumps are dissolved and all of the ingredients are thoroughly mixed together. The composition may now be sold or stored in this granular or powder form. At any desired time, the granular or powder mixture can be dissolved in aqueous solvent. The solution can be mixed until the granular powder mixture is dissolved, contains no lumps or visible traces of solid material, and the solution is clear.

The composition can be used in various types of conditions, but some conditions can make the composition especially effective. For example, applying the composition to dry materials in temperatures at 10 degrees Celsius or above has proven to be effective. However, the composition is effective when applied under alternative conditions. In one embodiment, the composition can be applied by spraying it onto a dry material or submerging a dry material into the composition. Preferably, the material is allowed to dry after being saturated with the composition. This only provides one example of how the composition can be used and should not be interpreted as a limitation to the invention.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Thus, it is intended that the scope of the present invention herein disclosed should not be limited by the particular disclosed embodiments described above.

What is claimed is:

1. A method of imparting flame retardancy to a material comprising applying a composition to the material, said composition comprising in a mixture:
   ammonium phosphate;
   a source of citrate ion; and
   a source of benzoate ion,
   wherein there is 1 part by weight of the source of citrate ion to 12.7 to 20 parts by weight of ammonium phosphate to 0.8 to 2.2 parts by weight of the source of benzoate ion.

2. The method of claim 1 wherein the composition is sprayed onto the material.

3. The method of claim 1 wherein the material is placed into the composition.

* * * * *